April 16, 1946. C. A. FRISCHE ET AL 2,398,421
ELECTRO-HYDRAULIC CONTROL SYSTEM
Filed July 15, 1939 3 Sheets-Sheet 1

INVENTORS
CARL A. FRISCHE
GEORGE P. BENTLEY
PERCY HALPERT
BY Herbert H. Thompson
THEIR ATTORNEY

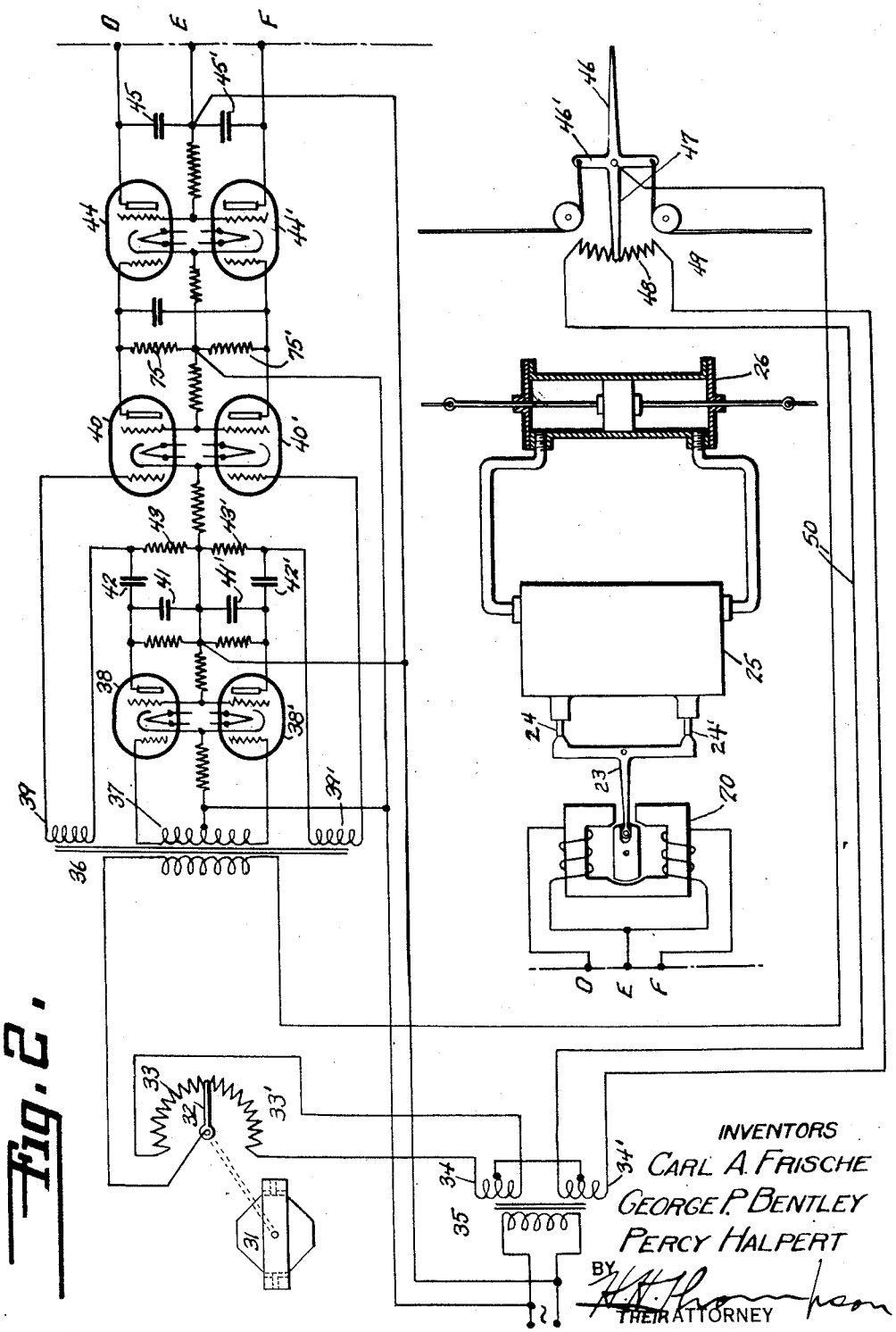

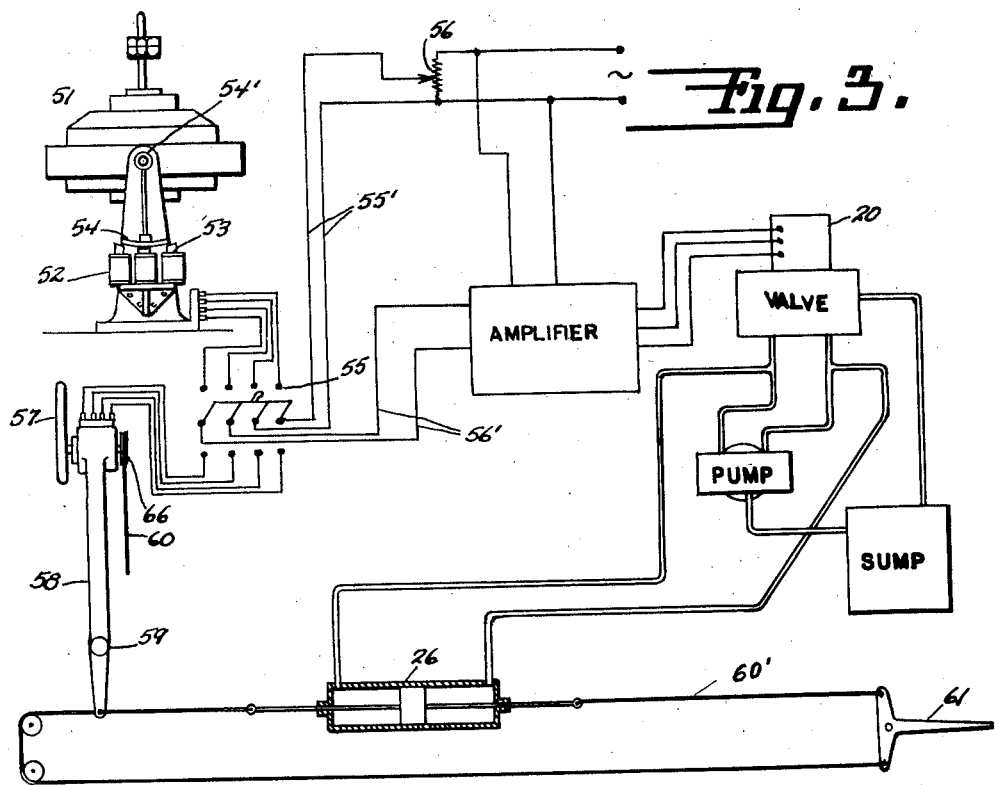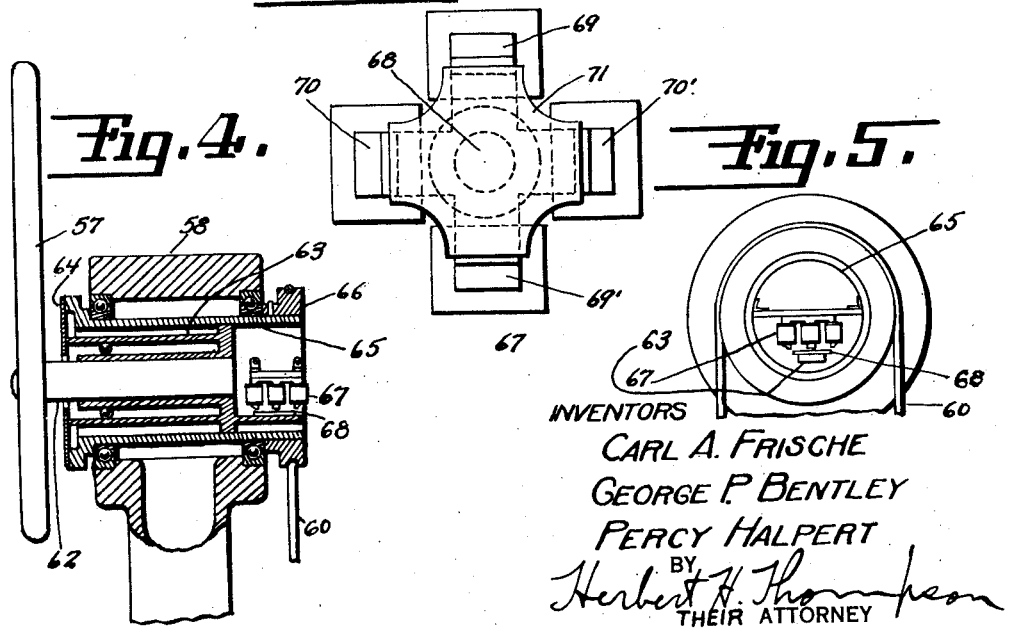

Patented Apr. 16, 1946

2,398,421

UNITED STATES PATENT OFFICE 2,398,421

ELECTROHYDRAULIC CONTROL SYSTEM

Carl A. Frische, Leonia, N. J., George P. Bentley, Wollaston, Mass., and Percy Halpert, Elmhurst, N. Y., assignors to Sperry Gyroscope Company, Inc., Brooklyn, N. Y., a corporation of New York Application July 15, 1939, Serial No. 284,642

12 Claims. (Cl. 244—76)

This invention relates to electro-hydraulic control system and it refers, more particularly, to the provision of remote electromagnetic control for the hydraulic control system of application, Ser. No. 259,178, filed March 1, 1939, by G. P. Bentley and C. A. Frische, although it obviously has wider application.

In the above mentioned application a type of hydraulic force or torque amplifying system is disclosed having quick response and anti-hunt characteristics which make it suitable for moving a controlled object against a relatively high resisting force in correspondence with a small controlling force. In the system disclosed in the above mentioned application, the control force is applied through mechanical or pneumatic transmission means to a valve controlling the operation of a reversible hydraulic motor. For many applications, however, a system of greater flexibility without the inherent limitations of such transmission means is required.

Our present invention provides for the generation of an electric control signal which is transmitted to electromagnetic force or torque-applying means operating the valve controlling the hydraulic motor of the previously disclosed hydraulic system. This method of control has the advantage not only of flexibility in transmitting the primary signal over wires but also of making it possible to modify said signal electrically by relatively simple circuit means to overcome the lag in following of the controlled object which would otherwise occur.

A difficulty which has been encountered in previous attempts to design a system of the above type has been a tendency for the mechanical force or torque exerting member to operate irregularly and vary the applied force or torque in steps instead of smoothly and in direct correspondence with the control signal or to generate a force or torque not directly proportional to the signal. Our present system employs a novel torque motor which applies a smoothly varying torque to the hydraulic valve directly proportional to the control signal and preserves all the advantages of the disclosed improved hydraulic system which inherently has a smooth control characteristic. Moreover, in order to secure quick response of the electro-hydraulic system as a whole, without hunting, we preferably control the torque motor not only in accordance with a primary signal proportional to the displacement of a controlling member or to the difference in displacements of a controlling and a controlled member, but also in accordance with a time derivative or derivatives of the primary signal. The function of derivative or rate signals in preventing hunting is discussed in U. S. Patent No. 2,139,558, issued to Francis L. Moseley, William T. Cooke and Carl A. Frische, December 6, 1938.

Co-pending application 259,178 illustrates the application of the hydraulic control system disclosed therein to the automatic steering of airplanes as the force amplifying means of an automatic pilot and our new method of electrical remote control is particularly useful in this application. Such electrical control is adaptable for use with many different types of aircraft steering systems. For example, an important case is a system in which control is exerted alternatively by an automatic pilot or manually with the aid of an intermediate servo system. With the electrical remote control disclosed herein, simple switching means may be provided to shift the control connections from the automatic pilot to the manual control column and the degree of force or torque amplification which the servo system supplies to aid manual control may be conveniently adjusted electrically.

One object of our present invention is to provide a composite electro-hydraulic control system whose force or torque amplification is readily adjustable.

Another object of our invention is to provide an electromagnetic torque motor for controlling the balanced oil valve of a hydraulic control system in accordance with an applied electrical signal.

A third object is to provide a control system in which a displacement of a sensitive controlling element causes a definite force to be exerted against a controlled object.

A still further object is to provide a control system in which a displacement of a sensitive controlling element causes a corresponding displacement of a controlled object.

Other objects and advantages of this invention will become apparent as the description proceeds.

In the drawings,

Fig. 2 is a diagram illustrating another form of our invention applied to a follow-up system having displacement repeat-back means.

Fig. 3 is a diagram illustrating the application of our invention to a steering control for aircraft in which either fully automatic or servo-aided manual control is employed.

Fig. 4 is an elevation, partly in section, showing the control wheel of an airplane with associated magnetic pick-ups for generating electric control signals.

Fig. 5 is an elevation of the control wheel at right angles to that of Fig. 4.

Fig. 6 is a plan view of the pick-up shown in Figs. 4 and 5, for generating two control signals in accordance with displacements along two mutually perpendicular axes.

Figure 1:
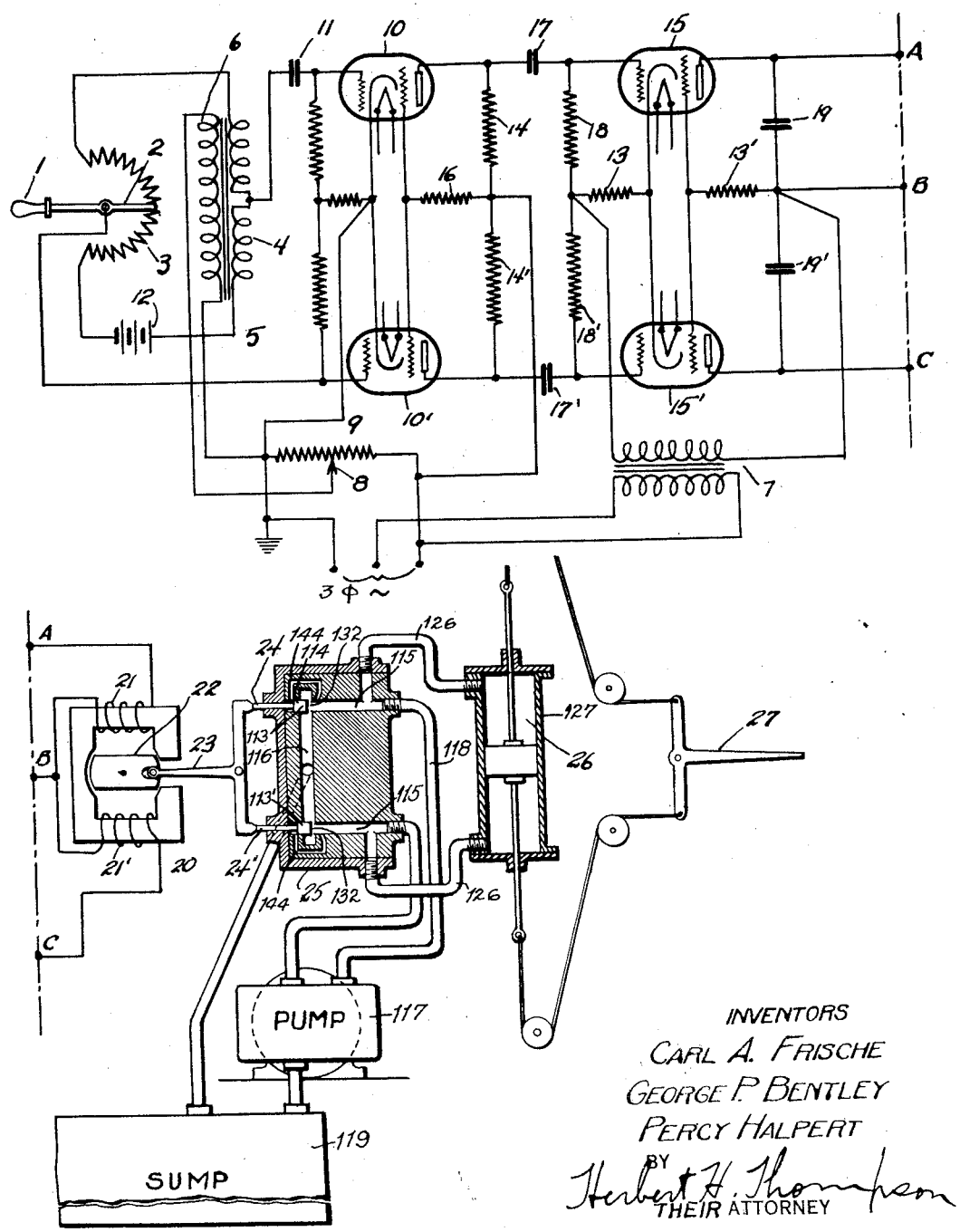
Fig. 1 is a diagram illustrating one form of our invention as applied to a follow-up system for steering aircraft and the like, in which the displacement of the controlling object is balanced by a resisting force excited against a rudder or other control surface.

Referring more particularly to Fig. 1, control handle 1 represents any displaceable member whose movement causes a signal E. M. F. to be generated proportional to displacement. Said handle is illustrated as pivotally mounted and carrying contact arm 2 in contact with potentiometer winding 3, said winding being connected across the split secondary winding 4 of transformer 5. Winding 4 has induced in it an alternating E. M. F. from primary winding 6 of the transformer. The potential across winding 6 is controlled by the position of movable contact 8 on potentiometer 9, said potentiometer being excited form one phase of a three-phase constant potential A. C. supply.

The two resistances into which potentiometer winding 3 is divided by the contact of arm 2 (said resistances being measured from the point of contact to the two ends of the winding) together with the two halves of split winding 4 of transformer 5 form the four arms of a bridge circuit. Winding 6 induces an alternating E. M. F. across one pair of bridge points while the control grids of vacuum tubes 10 and 10' receive the potential across the complementary bridge points through condenser 11. When arm 2 makes contact at the center of potentiometer resistance 3, the bridge is balanced for A. C. and as the said contact is moved in one direction or the other from this central position by control handle 1, the unbalance voltage of the bridge is applied to the control grids of tubes 10 and 10' connected in a balanced circuit. The phase of this voltage has two possible values differing by 180° depending upon the direction in which contact arm 2 is moved from its central position. This varying amplitude, reversible phase output of the bridge circuit supplies an A. C. signal proportional to the displacement of control handle 1.

In series with potentiometer winding 3 and transformer winding 4 is a source of direct current illustrated as battery 12, although obviously rectifier means may be substituted therefor if it is desirable to use only alternating current supply for the system. Said battery or rectifier voltage may be adjustable to vary the direct current supplied to potentiometer winding 3 and thereby vary the potential across said winding and the rate signal generated when contact arm 2 moves thereover as hereinafter described.

It will be apparent that direct current from battery 12 flowing in the circuit closed by windings 3 and 4 will cause a drop of D. C. potential across potentiometer winding 3 and that the D. C. potential applied between the left-hand plate of condenser 11 and the control grid of tube 10' will be dependent on the position of contact arm 2. When the potential between said two points is constant, that is, when contact arm 2 is stationary, regardless of the location of said arm, no D. C. potential is applied between the control grids of tubes 10 and 10'. When control handle 1 and arm 2 are in motion, however, a varying potential will be applied at the left-hand side of condenser 11 and a potential will appear at the right-hand side which is proportional to the rate of change of said varying potential, this rate of change potential being applied between the control grids of tubes 10 and 10'. The potential so applied to said grids depends as to sign on whether the potential at the left-hand side of condenser 11 is increasing or decreasing and as to magnitude on the rate at which the change is taking place. An additional signal is therefore generated by the motion of control handle 1 proportional to the rate of change or first time derivative of the displacement of said handle, which, as hereinbefore noted, illustrates any displaceable body. The rate of change or first derivative signal appears at the grids of tubes 10 and 10' as a varying D. C. potential superimposed on the A. C. displacement signal, the variations of D. C. signal occurring at a lower frequency than those of the A. C. signal.

Tubes 10 and 10' are operated entirely from alternating current supplied by the same phase of the three-phase constant potential source which supplies potentiometer winding 3 while tubes 15 and 15' are preferably operated from a different phase through transformer 7 to obtain proper phasing of the plate supply with respect to the signal applied to the grids. Tubes 10 and 10' are preferably tetrodes or pentodes. The A. C. plate potential is applied through resistors 14 and 14' while the potential for the two screen grids is applied through common resistor 16. The coupling from the output circuits of tubes 10 and 10' to the control grids of tubes 15 and 15' is through condensers 17 and 17'. The capacity of these condensers and the resistance of shunt grid resistors 18 and 18' has an important bearing on the operation of the circuit. In particular, the capacity of condensers 17 and 17' may be so chosen that they will freely pass the A. C. displacement signal, pass to some extent, the variation or ripple of the varying D. C. first derivative signal and at the same time generate a component voltage proportional to the rate of change of said variation or, in other words, proportional to the acceleration of control handle 1. In order to pass the variations of the first derivative signal which occur at a slow rate, the capacity of condensers 17 and 17' must be large and since too high a time constant is detrimental to the functioning of the circuit the resistance of resistors 18 and 18' is limited thereby. The action of a series condenser in generating a potential proportional to the rate of change of an applied potential has been described in connection with condenser 11.

A. C. potential from the secondary winding of transformer 7 is applied to the plate of tube 15 through the parallel circuit of condenser 19 and torque motor winding 21 and to the plate of tube 15' through a similar circuit formed by corresponding elements 19' and 21'. Screen potentials are applied through common resistor 13' while the drop across resistor 13, common to the two control grid circuits applies an A. C. bias to the grids. Condensers 19 and 19' bridged across the output circuits of tubes 15 and 15', respectively, substantially reduce the ripple in the rectified plate currents before said currents pass to the windings of the torque motor 20.

Torque motor 20 consists of a magnetic core on the two legs of which windings 21 and 21' are mounted, said windings being so connected as to cause the respective fluxes due thereto to flow in the same direction through armature member 22 common to their two magnetic circuits. A connection is made at the junction point of windings 21 and 21' to the A. C. plate supply lead for tubes 15 and 15'. Armature member 22 is pivoted within the core structure, the ends of said armature being in the form of circular arcs concentric with arcuate portions of the opening in core member 20. This construction is used to maintain a constant air gap between armature and core when said armature is rotated. Armature 22 has a slot in one end which engages the ball end of one arm of three arm lever 23, said lever actuating stems 24 and 24' of the piston valves of balanced oil valve 25.

A complete description of the construction and operation of the type of balanced oil valve used in our hydraulic control system and of the system as a whole has been given in application, Ser. No. 259,178. In general, it may be said that the torque exerted by torque motor 20 on three-arm lever 23 operates differentially on two piston valves 113, 113' of balanced oil valve 25 to differentially change the pressure supplied to the two ends of reversible hydraulic motor 26 which is directly connected to and causes the rotation of aircraft rudder surface 27. Each piston projects beyond its guide cylinder 114, partially closing the orifices 132 of the passages 115 where they communicate with the transverse passage 116. Pressure fluid from the double-acting pump 117 is drawn from the sump 119 and circulates in two paths continuously through pipe 118, through the aforementioned passages 115, past the throttling valves 113, 113', and back to the sump, the pressure in each path being transmitted to the two sides of the cylinder 127 through pipes 126. The pressure in the two ends of the cylinder varies inversely with the amount of throttling created by the throttle valves 113, 113'. A small by-pass 144 connects each passage 115 with the back of each cylinder valve 113, 113' so as to partially equalize the pressure on the two sides of the pistons. Hence there are two opposing forces acting in each of the pistons, (1) that exerted by the armature 22 through lever 23 and (2) a small portion of the differential hydraulic pressure in the two passages 115. In the absence of any signal, the control lever will assume a balanced position caused by the balanced pressure on the two pistons, so that the valve is inherently stable. When the pistons are displaced from their balanced position by the armature 22, the lever 23 will be rotated slightly, moving the pistons in opposite directions to further restrict one orifice, 132 for example, and further open the other orifice, resulting in a higher pressure in one passage 115 than in the other. A balance will hence be reached quickly, and the pistons come to rest when the differential back pressure on the pistons balances the force exerted by the armature 22 thereon, as more fully explained in the aforesaid application.

The operation of torque motor 20 is as follows: When no control signal is generated, equal direct currents are supplied to the two windings 21 and 21' producing equal fluxes in the two branches of the divided magnetic circuit to which armature 22 is common. The degree of saturation of the iron is such that the working point is approximately at the center of the linear portion of the magnetization curve. A signal causes the direct current output of one of tubes 15 or 15' to increase while the current in the output of the other tube decreases, thus producing weakening of the flux in one of the two magnetic paths of torque motor 20 and strengthening of the flux in the other path. Since pivoted armature 22 tends to assume a position in which the greatest flux passes through it, a torque will be generated tending to rotate it to such a position. Due to the adjustment of the operating point to the linear portion of the magnetization curve, the relationship between the torque developed and the differential change of current in windings 21 and 21' is a linear one. It is to be understood that a form different from the one shown may be adopted for armature 22 and a different method of pivoting without departing from the scope of our invention, the essential features of our novel torque motor being that in the balanced condition, a constant flux permeates the material of the magnetic circuit and magnetizes it to a degree which corresponds approximately to the center of the linear portion of its magnetization curve and that a signal applied to the magnetizing windings causes an increase in current of one winding and a decrease of current in the opposite winding, the opposite excursions along the magnetization curve due to these opposite changes of current being substantially equal and opposite.

It will be obvious that the A. C. displacement signal which has been described by way of illustration as being generated by the unbalance of the resistance arms of a bridge circuit may be generated by other well known means among which are a "Selsyn" transmitter used as a signal generator such as the A. C. inductive transmitter described in U. S. Patent No. 2,054,945 to R. H. Nisbet or by means of the 3-legged or double control transformer commonly used as a pick-up in connection with gyro compasses and described in the aforementioned U. S. Patent No. 2,139,558 to F. L. Moseley, W. T. Cooke and C. A. Frische.

In the system illustrated in Fig. 1, it is assumed that the aircraft rudder surface 27 experiences a pressure normal to its surface which increases as the surface is rotated away from its central position. As described in application Ser. No. 259,178, the differential pressure in the oil lines 126 will increase in one direction or the other until the back hydraulic pressure on the valves 113, 113' balances the force exerted by the armature 22. This results in the servo motor 26 rotating the control surface 27 until the back air pressure thereon balances the force exerted by the piston. The force exerted on the rudder is therefore proportional to the torque exerted on lever 23 by torque motor 20 which, in turn, is proportional to the primary electric signal from the pick-up and to the displacement and rate of displacement of control handle 1. It will be apparent, therefore, that Fig. 1 illustrates a system in which the displacement of a control member causes a force proportional to the said displacement and a rate thereof to act on the controlled object.

The system illustrated in Fig. 2 is a control system with displacement repeat-back, that is, one in which a displacement of the controlled object generates a signal opposing and finally wiping out the signal generated by the controlling object, the former object thereby being displaced to a position corresponding to that of the latter object. The controlling object here shown for purposes of illustration is a directional gyroscope 31 of the well known type used for automatic steering of marine and air craft, and the controlled object a rudder 46. The same objects may be similarly associated with the circuit of Fig. 1. Mounted on the vertical gimbal axis of gyro 31 is a potentiometer 33' having a contact arm 32 displaceable along resistance winding 33 in response to relative motion between the vertically pivoted rotor housing which is stabilized in azimuth, and the instrument case which rotates with the craft. It will be understood that other signal generators such as are herein referred to may be substituted for potentiometer 33'. Potentiometer winding 33 has applied to it an A. C. potential supplied by secondary winding 34 of transformer 35 whose primary is connected to the constant potential single phase A. C. source which supplies the amplifier tubes.

Rate generating means such as battery 12 and condenser 11 of Fig. 1 may be used in connection with the circuit of Fig. 2. However, to illustrate different types of rate circuits which may be employed in cooperation with the amplifier circuits of our invention, in Fig. 2, a modification is shown which will be later described.

The A. C. potential determined by the position of contact arm 32 on potentiometer winding 33 is applied to the primary winding of input transformer 36 in series with the potential derived from potentiometer 49, controlled by the position of rudder 46. The current through the primary winding of transformer 36 induces alternating potentials in three secondary windings 37, 39 and 39'. Secondary winding 37 is connected to the control grids of vacuum tubes 38 and 38' in a balanced circuit while the two secondary windings 39 and 39' are connected to the control grids of vacuum tubes 40 and 40' likewise connected in a balanced circuit.

The output of tubes 38 and 38' is supplied to a resistance condenser network for the purpose of generating a time derivative or rate of the electrical signal. The plate circuits of tubes 38 and 38' are connected to a source of A. C. potential and the output therefore consists of an A. C. component and a D. C. component, the latter being produced by plate circuit rectification. The A. C. component or ripple is substantially reduced by shunt condensers 41 and 41', the capacity of these condensers not being high enough to give the circuit an unduly high time constant. The potential applied to the left-hand plates of condensers 42 and 42', therefore, is without any substantial component of supply frequency. The D. C. potential varies as control handle 31 is moved and as said potential varies a varying D. C. potential will appear on the right-hand plates of condensers 42 and 42' which is proportional to the rate of change thereof. This derivative or rate potential is applied across resistors 43 and 43' in series with the potentials across transformer windings 39 and 39' to the control grids of tetrodes 40 and 40'. Tubes 40 and 40' rectify the A. C. signal and the combined A. C. and D. C. components of the plate current generate corresponding potentials across resistors 75 and 75' which potentials are directly applied to the grids of tubes 44 and 44' without the intermediary of coupling condensers. The advantage of this circuit arrangement is that it shows the complete amplifier to be supplied from a single phase A. C. source and does not require the use of phase shift means or isolating transformers. The amplifier becomes more sensitive when coupling condensers are omitted since the entire value of the D. C. signal is applied to the grids of tube 44 and 44' whereas when condenser coupling is employed, a large part of this signal is lost. It will be seen, therefore, that there is applied to said grids an A. C. signal proportional to the displacement of the controlling body, i. e., control handle 31, and a D. C. signal proportional to the rate of change of displacement or to the velocity of said body, the displacement signal being applied through secondary transformer windings 39 and 39' while the derivative signal is applied across resistors 43 and 43'. Obviously, higher derivatives of the signal may be obtained by successive electrical differentiation and combined with the velocity term as was disclosed in connection with the circuit of Fig. 1.

Tubes 40 and 40' are directly coupled to balanced output tubes 44 and 44' and the rectified plate current of said pair of tubes is supplied to torque motor 20, condensers 45 and 45' serving to reduce ripple. As has been described in connection with the circuit of Fig. 1, said torque motor controls balanced oil valve 25 and through it causes hydraulic motor 26 to move a controlled object here illustrated as aircraft rudder 46 by rotating pivoted lever 46'. A contact arm 47 carried by said lever bears a contact movable across winding 48 of potentiometer 49 to which is applied an A. C. potential through secondary winding 34' of transformer 35. The A. C. output potential derived from potentiometer 49 and applied to leads 50 is therefore proportional to the movement of rudder 46. This output potential is applied in series with the potential derived from potentiometer winding 33 as has been hereinbefore described and in opposite phase relation thereto whereby upon the rotation of rudder 46 through a definite angle, the two potentials become equal and opposite in phase and annul one another, no signal being then applied to input transformer 36.

Referring to Fig. 3, we illustrate one embodiment of our invention applied to a system providing means for controlling an aircraft alternatively, by means of an automatic pilot through a servo system, or manually through the same servo system. Reference number 51 applies generally to one of the gyroscopic control instruments of an automatic pilot, for example, the bank and climb gyro. Such instruments are well known in connection with automatic pilots of the type described n U. S. Patent #1,992,970, to E. A. Sperry, B. G. Carlson and M. F. Bates. A pick-up 52 on one axis of this gyro is shown as the three-legged transformer hereinbefore referred to as one type of signal generating means. Said pick-up has a core member 53 carrying the exciting and signal windings and supported from the housing of the instrument and an armature 54 supported from shaft 54' whose rotation with respect to the housing disturbs the normal balance of the E. M. F.'s in the two halves of the signal windings of the pick-up and generates a control signal proportional to the magnitude and sense of the motion about the axis of shaft 54'. With four-pole double-throw switch 55 closed upwardly, exciting current is supplied to the pick-up transformer from an A. C. source through leads 55' the strength of said exciting current being adjustable by means of potentiometer 56. When a relative displacement occurs between armature 54 and core 53 due to a component of rotation about the axis of shaft 54' the signal E. M. F. generated in the signal winding is applied to the input terminals of an amplifier of any suitable type such as the amplifiers shown diagrammatically in Fig. 1 and Fig. 2. This signal E. M. F. is amplified and rectified and applied to torque motor 20 to control the hydraulic servo system of our copending application, in a manner similar to that described in connection with the signals generated in the circuits of Fig. 1 and Fig. 2.

While for the sake of simplicity the form of our invention illustrated by the control system of Fig. 3 is shown in connection with only one axis of the "bank and climb" gyro, it will be readily understood that a similar control system will normally be associated with the other gimbal axis of said gyro, whereby both the banking and the climbing (or diving) of the aircraft are controlled. Also, it will be understood that similar apparatus may be, and normally will be, employed to control the course of the craft in connection with a direction maintaining instrument such as the conventional directional gyro of an automatic pilot.

When switch 55 is thrown downwardly it connects the A. C. supply via leads 55' from potentiometer 56 and the signal amplifier, via leads 56', to pick-up 67 mounted on aileron control wheel 57 carried by control column 58. Wheel 57 is capable of rotation through a limited arc about the axis of shaft 62 and thereby moves control cable 60 to cause banking of the craft by a connection to the ailerons (not shown). Column 58 is mounted for limited rotation about pivot point 59 to control the climbing and diving of the craft by rotating elevator surface 61, either directly or through the servo system of the climb and dive control of the automatic pilot. On large aircraft direct manual operation of the control surfaces requires that considerable force be applied at the control which is very tiring for the pilot and it is one object of our invention to make use of our improved control system in connection with pick-ups which generate electric signals therefor with the exertion of little force at the stick, retaining means for direct operation which automatically come into operation in case of emergency.

The association of pick-ups with aileron control wheel 57 and control column 58 is shown in detail in Fig. 4 and Fig. 5. Wheel 57 is rigidly mounted on shaft 62 carrying hub member 63, said hub member having a torsionally resilient portion in the form of a sleeve attached at one end to resilient diaphragm 64. The outer part of said diaphragm is attached to sleeve 65 mounted for rotation in anti-friction bearings seated in the enlarged head of control column 58. On sleeve 65 is mounted the core of pick-up transformer 67 whose co-operating armature, 68, is carried by hub member 63. The construction of pick-up transformer 67 is shown more particularly in Fig. 6, said pick-up being one form of a device for generating independent signals in response to motion along or about two axes. A cruciform core comprising a central pole piece 68 which carries an exciting winding and two pairs of symmetrically disposed outer pole pieces 69, 69' and 70, 70' which carry two signal windings each divided between opposite poles, is the equivalent of two of the three-legged or double signal transformers hereinbefore referred to, the central or exciting pole being common to the two transformers. Co-operating armature 71 is likewise of cruciform construction and is normally centered on transformer 67 so that the voltages generated in opposite halves of both signal windings annul one another. A displacement from this central or balanced position along a line joining either pair of signal poles generates a signal corresponding in magnitude and phase to the magnitude and sense of said displacement. The core of transformer 67 being carried on sleeve 65 and armature 71 on extension of hub member 63, a signal will be generated in response to relative motion between said sleeve and hub in either of two directions. Relative motion along the line joining one pair of signal poles may be produced by a force applied to control column 58 tending to rock it about pivot point 59, said force producing flexure of diaphragm 64. This displacement need be of the order of only a few thousandths of an inch to generate a signal which when amplified and rectified is sufficient to cause torque motor 20 to rotate elevator surface 61 through a relatively large angle. Thus, when the servo system is operating only a small force is exerted by the pilot to control the climbing and diving of the craft. The connection of the piston of hydraulic motor 26 to cable 60' operated by control column 58 for rotating elevator surface 61 however, makes it possible to move surface 61 either through the servo system or, in an emergency and by the exertion of greater force, directly without any change of control connections.

In this connection it may be noted that direct manual control through the joy stick controller 57, 58 may readily be effected at all times regardless of the position of the switch 55, since the hydraulic control system (shown in detail in Fig. 1) is of the continuous flow or non-locking type, in which the control valves 24 and 24' are both normally open, as distinct from the closed or self-locking hydraulic system shown in the Sperry, Carlson, Bates patent above referred to. No relief valve, therefore, is necessary in applicants' system to enable the pilot to assume instant control, since the hydraulic system is never locked and the rudder may therefore be readily direct controlled by hand whether the automatic pilot is in operation or not, or whether or not the hydraulic system has failed.

Relative motion at right angles to the described motion between pick-up transformer 67 and armature 68 occurs when a torque is exerted tending to rotate wheel 57 about the axis of shaft 62 for the purpose of changing the angle of bank of the craft. The signal thereby generated is applied to a second amplifier and servo system, not shown, to rotate the craft's ailerons. Shaft 62 mounts pulley 66 over which cable 60 passes, said cable being connected to the ailerons in tandem with the hydraulic motor of a servo system in the same manner as cable 60' for climb and dive control. Direct manual control of banking is thereby provided for emergencies should the servo apparatus become inoperative.

It will be apparent that combined manual and servo control of the motion of the craft about a third axis may be provided for by the association of apparatus similar to that just described with the rudder controlling the craft's course.

The stiffness of diaphragm 64 and of the resilient portion of hub member 63 may be made high in view of the small displacements required for servo control so that direct manual control may be exerted without the pilot being aware of excessive "give" in the handling of the control column and wheel.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In a remote control system comprising a controlling object, a controlled object, a source of hydraulic pressure and a reversible hydraulic motor for displacing said controlled object, the combination including means for generating a composite electric signal having components proportional to the differential displacement of said two objects and to a time derivative thereof, and an electro-hydraulic relay for said hydraulic motor actuated primarily by said signal and secondarily by the hydraulic pressure in said motor for causing said motor to exert a force on said controlled object proportional to the magnitude and sense of the signal, said relay including a torque device producing a torque proportional to the magnitude of said signal and a piston-like throttle valve subject to the torque of said device and to the counter-pressure of the hydraulic fluid in said motor.

2. In a system for controlling the flight of an aircraft comprising a controlling element, a displaceable control surface of the craft, a source of hydraulic pressure and a reversible hydraulic motor powered from said source for moving said surface, the combination including means for generating a composite electric signal having components proportional to the differential displacement of said controlling element and said surface and to a time derivative thereof, and an electro-hydraulic relay for said hydraulic motor actuated primarily by said signal and secondarily by the hydraulic pressure in said motor for causing said motor to exert a force upon said control surface proportional to the signal, said relay including a torque device producing a torque proportional to the magnitude of said signal and a piston-like throttle valve subject to the torque of said device and to the counter-pressure of the hydraulic fluid in said motor.

3. In an electric control system, means for generating a composite electric signal having components proportional to the displacement of a displaceable member and to the time rate of change of the displacement thereof, comprising an alternating current supply, a direct current supply, a bridge network normally balanced as to alternating current of the frequency of said supply, means for simultaneously applying A. C. and D. C. potentials derived from said two supplies to said network, means for causing the displacement of said member to unbalance said network and generate an alternating E. M. F. therein proportional to said displacement, means for causing the displacement of said member to vary the D. C. potential between two points of said network in proportion to the displacement, means for generating an E. M. F. proportional to the rate of change of said varying D. C. potential and means for combining said alternating E. M. F. due to bridge unbalance and said rate of change E. M. F.

4. In an electric control system, means for generating and amplifying a composite electric signal having components proportional to the displacement of a displaceable member and to the time rate of change of displacement thereof, comprising means for generating an A. C. signal proportional to the displacement of said member, means for generating a D. C. signal proportional to the rate of change of displacement of said member, means for combining said two signals, means for amplifying and rectifying said combined signal, an A. C. operated amplifier, and means for applying the steady component of said rectified signal as a bias to said amplifier for controllably adjusting the same to suitably amplify the varying component of said rectified signal.

5. Apparatus for producing a composite electrical signal having unidirectional and alternating components, each proportional to the displacement of a control member, comprising a bridge network, one pair of adjacent arms of which comprise a center-tapped impedance, the other pair of adjacent arms being composed of a potentiometer whose variable arm is controlled by said member, means for impressing an alternating voltage across said impedance and potentiometer, and means for impressing a unidirectional voltage in series with said potentiometer and impedance, whereby the voltage output between said center-tap and said arm contains direct and alternating components, each corresponding to the displacement of said member from the position corresponding to balance of said bridge.

6. Apparatus as in claim 5 further including means for converting said unidirectional voltage component into a unidirectional voltage having magnitude and polarity corresponding to the rate of change of said unidirectional voltage component and for simultaneously passing said alternating component unchanged.

7. Apparatus for producing a composite electrical signal having unidirectional and alternating components, each proportional to the displacement of a control member, comprising a bridge network whose condition of balance is under the control of said control member, means for energizing one diagonal of said bridge network by an alternating voltage, and means for connecting a source of direct voltage in series with one arm of said bridge whereby the voltage across the second diagonal of said bridge will be said composite signal.

8. Apparatus as in claim 7 further including means for converting said unidirectional signal component into a unidirectional signal having magnitude and polarity corresponding to the rate of change of said unidirectional signal component, and for simultaneously passing said alternating component unchanged, whereby said composite signal corresponds to a combination of the displacement and rate of displacement of said member.

9. In a power-operated rudder servo system having a controller and a hydraulic rudder motor powered by a source of hydraulic pressure and controlled by said controller, the combination including means for generating an electrical signal proportional to the displacement of said controller from a predetermined position, means for deriving therefrom an electrical signal proportional to at least one time derivative of said displacement, means for combining said signals, and an electro-hydraulic valve for controlling the operation of said hydraulic motor from said pressure source in accordance with said combined signals and for causing said motor to exert a force upon said rudder proportional to the combined signals, said valve including a torque device producing a torque proportional to the magnitude of said signal and a piston-like throttle valve subject to the torque of said device and to the counter-pressure of the hydraulic fluid in said motor, whereby said rudder is displaced until the pressure thereon due to the motion of the vehicle is balanced by the pressure exerted by said hydraulic motor.

10. A control system for aircraft having a controllable aerofoil, comprising an attitude-maintaining device, electric pick-off means for producing a variable-magnitude, reversible-phase electric signal corresponding in magnitude and phase to the magnitude and sense of relative displacement of said craft from an attitude determined by said device, a non-centralized magnetic torque motor controlled by said signal and adapted to produce a torque corresponding in magnitude and sense to said signal, a source of fluid pressure, a dual balanced throttle valve structure oppositely actuated by said motor for producing differential fluid pressure from said source also corresponding in magnitude and sense to said signal, said pressure reacting on said torque motor through said valves to balance the torque therein produced, and a servo motor responsive to said differential pressure for exerting a force on said aerofoil, whereby said aerofoil is caused to assume a position at which the reaction of its surrounding medium is balanced by said force.

11. In a fluid servo system for the steering of craft, an electric controller producing comparatively weak reversible signals proportionate to the direction and amount of displacement thereof, a pump for continuously circulating fluid to a sump, a throttling valve in the connections between said pump and sump for controlling the pressure in said connections, a fluid pressure motor subject to the pressure in said connections, said valve having a piston exposed to the controlled pressure, a bypass connection for balancing a portion of such pressure exerted on said piston, and a torque motor controlled from said controller adapted to exert a force on said piston in opposition to the unbalanced hydraulic pressure thereon, whereby said piston is displaced an amount proportionate to the torque of said torque motor to increase the throttling and whereby said rudder is displaced until the back pressure thereon balances the fluid pressure in said motor.

12. In a fluid servo system for the steering of craft, an electric controller producing comparatively weak reversible signals proportionate to the direction and amount of displacement thereof, a pump for continuously circulating fluid in two paths to a sump, a pair of oppositely acting throttle valves in the connections between said pump and sump for oppositely controlling the pressure in said connctions, each valve having a piston exposed to the controlled pressure, a bypass connection for balancing a portion of said pressure, and a torque motor controlled from said controller and reversely connected to said valves, to exert a torque in either direction to move the valves oppositely until the fluid pressure on the throttle valves balances the torque of the motor, and a fluid pressure motor subject to the differential pressure created in the two connections.

CARL A. FRISCHE.
GEORGE P. BENTLEY.
PERCY HALPERT.